United States Patent Office 3,322,271
Patented May 30, 1967

3,322,271
REMOVAL OF STALK FROM
MANUFACTURED TEA
Harold Douglas Edwards, 2 Minehead Road,
London, England
No Drawing. Filed Apr. 20, 1964, Ser. No. 361,227
Claims priority, application Great Britain, May 16, 1963,
19,508/63
14 Claims. (Cl. 209—2)

This invention relates to the removal or separation of stalks and stalky material from manufactured tea.

Tea resulting from all known methods of tea manufacture consists of a mixture of leafy portions and of stalk. Some of the portions of leaf have small pieces of stalk adhering to them, and some stalk has leaf attached. The leafy portions are of value in producing colour, body and aroma when the tea is infused. The stalk is an unwanted diluent. The presence of stalk detracts from the appearance and value of tea, and when in excess renders the tea of no commercial value. Hitherto, stalk has been removed by such methods as hand picking and sorting, by electrostatic means, and by repeated sifting. Of these methods, the first is subject to the human element, its efficiency and degree of completeness depend on manual skill, and its cost is very high, so much so that only the larger and more obvious pieces of stalk in the larger size grades of tea can be so removed economically. The second method does not work efficiently with all types of tea and is by no means highly effective with any type of tea. The third method is also only partially successful, and has the great disadvantage that by reason of the mechanical nature of the operation the leaf is damaged and becomes greyish black in colour which detracts from its quality and value.

An object of this invention is to provide an improved process of stalk separation which is efficient and economical and obviates the disadvantages of methods practised hitherto. Another object is to provide for effective separation of stalk at an intermediate stage in the process of tea manufacture whereby subsequent processing of the leaf may be facilitated and improved. Further objects are to improve the yield of valuable leaf in tea manufacture and to improve the quality and value of the manufactured product. These and other objects and advantages of this invention will appear from the ensuing description.

According to the present invention there is provided a process of separating stalk from tea leaf which consists of immersing a mixture of stalk and the tea leaf in a volatile organic liquid medium of such specific gravity that the stalk rises and the tea leaf sinks in the liquid, dividing the liquid into stalk-containing and leaf-containing portions and treating each portion to separate the solids (stalk and tea leaf respectively) from the liquid medium and to recover the liquid. The latter may be separated from each of the two fractions by filtration or centrifugation and evaporation and the like methods, and the liquid and vapour recovered for re-use.

A suitable liquid medium for use in the process according to this invention is one having a specific gravity in the range of about 1.15 to 1.35 and most preferably in the range 1.25 to 1.35 at ambient temperature. The medium may be a single organic compound, for instance 1,1,1-trichloroethane, which in its commercially available forms has a specific gravity of 1.31 to 1.33. Alternatively the liquid medium may be a mixture of organic liquids. In this case it is advantageous to employ a mixture of liquids of which at least one has a higher and another a lower specific gravity than the range 1.15 to 1.35 given above so that by suitably proportioning the liquids any desired intermediate specific gravity may be obtained. It is also advantageous to select the components of the mixture so that their boiling points are not widely separated from each other and that they are not unduly high or low. The boiling range of the mixture may suitably be between 25° and 125° C. at atmospheric pressure, the range 60°–90° C. being preferred for ease of operation without undue loss of solvent by evaporation and yet allowing easy recovery of solvent by distillation when desired. Higher boiling solvents may be employed although a boiling point much in excess of 125° C. brings with it difficulties in evaporating residual solvent from the separated tea and ultimate recovery of solvent for re-use.

As examples of suitable liquids of high specific gravity there may be mentioned halogenated hydrocarbons, particularly trichloroethylene, perchloroethylene, carbon tetrachloride, 1,1,2-trichloro-1,2,2-trifluoroethane and methylene chloride, and these may be mixed with liquids of lower specific gravity, for instance aromatic hydrocarbons such as benzene, and paraffinic hydrocarbons such as petroleum fractions, in order to produce mixtures of suitable specific gravity for use in the process of the invention. As mentioned hereinbefore, 1,1,1-trichloroethane may be used alone as the liquid medium. Within the scope of the invention, however, this compound also may be admixed with small amounts of another liquid, for instance a hydrocarbon, in order to produce a mixture of lower specific gravity if desired.

The liquid medium to be suitable for use in the process according to this invention preferably has a negligible dissolving effect on the valuable constituents of the tea leaf. Slight solubility of such valuable constituents in the liquid medium is not a disadvantage, since when the liquid is re-used several times it rapidly becomes saturated with such constituents and then exerts no appreciable further dissolving action. Also, during volatilization of the liquid any such dissolved materials are re-deposited on the leaf. It is also important that the liquid medium used should leave no objectionable residues after evaporation, which might affect the taste or smell of the tea. The liquid medium should also have little or no infusing effect on the leaf, an effect which is absent or indetectable when the media described above which are substantially immiscible with water, are used.

An advantage of the stalk separation process according to this invention is that stalk can be removed at any stage in the process of tea manufacture after that known as firing. If, according to a feature of this invention, the process of the invention is applied immediately after firing, the stalk free leaf thereby obtained requires much less subsequent mechanical handling and abrasion to reduce it to the desired size grades, and there is achieved a great reduction in the proportions of fines and dust. Moreover the dark colour and good appearance of the larger size fractions are retained.

A further advantage of this invention is that teas prepared by the normal manufacturing methods, and which have become "grey" due to mechanical work and abrasion, are largely restored to the desirable black colour.

Yet another advantage is that valuable tea leaf is recovered from stalky residues which have hitherto been of no commercial value.

The following examples illustrate typical methods of carrying the invention into effect, but the scope of the invention is not limited thereto.

Example 1

A liquid medium was prepared consisting of equal volumes of high purity benzene (sp. gr. 0.879) and of carbon tetrachloride (sp. gr. 1.595) which were well mixed, producing a liquid having a specific gravity of 1.23. A quantity of a commercial grade of Assam tea was immersed in the liquid, well agitated and then allowed to stand for one minute. The stalky portions rose to the surface, while the black, leafy portions sank to the bottom. The film of liquid still adhering to the stalk was recovered by heating the stalk in a vessel, and evaporating the liquid medium. The latter was condensed and recovered for re-use.

The mixture of leaf with liquid was similarly separated and the liquid similarly recovered for re-use.

Example 2

Separation of stalk from tea was carried out in a similar manner to that described in Example 1 but using a liquid medium consisting of three volumes of benzene mixed with four volumes of carbon tetrachloride, producing a liquid having a specific gravity of approximately 1.29.

It was found in this case that a slightly higher proportion of stalky material was separated.

It will be appreciated that in addition to substantially leaf-free stalk and substantially stalk-free leaf fractions, there is always a small fraction consisting of intermediate pieces which rise or fall in the liquid medium very slowly, but do not affect the main, highly efficient separation.

Example 3

Separation of stalk from tea was carried out in a similar manner to that described in Example 1 but using a liquid medium consisting of two volumes of trichloroethylene of specific gravity 1.466 with one volume of benzene of specific gravity 0.879 which yielded a medium of specific gravity 1.27. Samples of manufactured tea having stalk contents ranging from 2% to nearly 20% were successfully separated into tea leaf and tea stalk fractions, these samples being of teas manufactured in Assam and in Ceylon. In all cases the value of the separated tea leaf was rated by independent experts on tea quality as higher per unit weight than the unseparated tea.

Example 4

A Ceylon tea containing a high proportion of stalk was immersed in "Genklene" which is the liquid marketed by Imperial Chemical Industries Ltd. consisting of stabilised 1,1,1-trichloroethane, a non-inflammable organic liquid having a boiling point of 75° C. and with a specific gravity of 1.31. The tea and the liquid were well agitated for approximately ten seconds and then allowed to stand. The stalk rose and the tea leaf sank in the liquid, which was then divided into stalk and tea leaf containing portions. The liquid was strained from the solids and the residual liquid adhering to the solids evaporated by exposure to a temperature of 80° C. in an oven with free circulation of air for thirty minutes. At the end of this time the tea leaf and the stalk were tested for residual solvent and it was found that none could be detected using a technique sensitive to less than one part in ten million.

Example 5

Separation of stalk from tea was carried out as described in Example 4 except that 1,1,1-trichloroethane without stabiliser, having a specific gravity of 1.33 was used in admixture with sufficient of a low boiling petroleum fraction to yield a mixture of specific gravity 1.29, with substantially similar results.

Similar results have also been obtained using as the liquid medium a petroleum fraction of boiling range 70–100° C. in admixture with one of the halogenated solvents trichloroethylene, perchloroethylene and 1,1,2-trichloro-1,2,2-trifluoroethane in the proportions by volume shown in the following table, which gave a mixture of specific gravity 1.31 in each case.

| Parts of Petroleum Fraction | Parts of Halogenated Solvent | |
|---|---|---|
| 23 | Trichloroethylene, | 77. |
| 36 | Perchloroethylene, | 64. |
| 32 | 1,1,2-trichloro-1,2,2-trifluoroethane, | 68. |

I claim:
1. A process for producing a residual tea fraction enriched in leaf content from a manufactured tea consisting of a mixture of fired tea leaf and stalk in which the particles of the tea mixture are of various densities and one fraction of the tea mixture which is less than a predetermined density is predominantly stalk, which comprises
   immersing the mixture in a volatile organic liquid medium of said predetermined density whereby said one fraction preferentially floats therein, and said residual tea fraction sinks therein,
   separating said one fraction and the liquid in contact therewith from the residual tea fraction and the liquid in contact therewith,
   and recovering the two solid fractions from the portions so separated.
2. A process according to claim 1 wherein the liquid medium is 1,1,1-trichloroethane.
3. A process according to claim 1 wherein the liquid medium consists of a mixture of 1,1,1-trichloroethane and a hydrocarbon of lower specific gravity.
4. The process according to claim 1 wherein said liquid medium has a specific gravity within the range of 1.15–1.35.
5. A process for producing a tea fraction enriched in leaf content from a manufactured tea consisting of fired tea leaf and stalk, which comprises
   mixing two volatile organic liquid media of different specific gravities to provide a recovery liquid having a specific gravity within the range of 1.15–1.35 to preferentially float at least some of the stalk of said manufactured tea,
   immersing said manufactured tea in said recovery liquid, whereby some of the stalk floats and said tea fraction enriched in leaf content sinks,
   and then separating the preferentially floating stalk from the leaf enriched sinks fraction.
6. A process according to claim 5 wherein one of said liquids has a specific gravity greater than 1.35 and another of said liquids has a specific gravity less than 1.15.
7. A process for producing a tea enriched in leaf content from a manufactured tea consisting of fired tea leaves and stalk, which comprises
   immersing the manufactured tea in a column of volatile organic liquid medium having a specific gravity within the range of 1.15 to 1.35,
   agitating the mixture and then allowing it to stand in quiescent state, whereby some of the stalk floats and the leaf enriched fraction sinks,
   separating the stalk fraction in the upper part of the column from the leaf enriched fraction in the lower part of the column,
   and recovering the stalk and leaf from the fractions so separated.
8. In the process according to claim 7 wherein the organic liquid medium is a mixture of benzene and carbon tetrachloride.
9. In the process according to claim 7 wherein the organic liquid medium is a mixture of benzene and trichloroethylene.

10. In the process according to claim 7 wherein the organic liquid medium is 1,1,1-trichloroethane.

11. In the process according to claim 7 wherein the organic liquid medium is a mixture of a petroleum fraction having a boiling range of 70–100° C. and trichloroethylene.

12. In the process according to claim 7 wherein the organic liquid medium is a mixture of a petroleum fraction having a boiling range of 70–100° C. and perchloroethylene.

13. In the process according to claim 7 wherein the organic liquid medium is a mixture of petroleum fraction having a boiling range of 70–100° C. and 1,1,2-trichloro-1,2,2-trifluoroethane.

14. A process for producing a tea fraction enriched in leaf content from a manufactured tea mixture of tea leaf and stalk, which comprises the steps of immersing said mixture in a volatile organic liquid medium having a predetermined value of specific gravity such that at least some of the stalk rises and the majority of the leaf sinks in the liquid, dividing the liquid into portions enriched in stalk and leaf components respectively, and treating each portion to separate the solids therein from the liquid medium, and recovering the liquid from both portions.

References Cited

UNITED STATES PATENTS

| | | | |
|---|---|---|---|
| 1,945,771 | 2/1934 | Dahlstrom | 209—133 |
| 2,028,132 | 1/1936 | Bienestock | 209—172 |
| 2,150,917 | 3/1939 | Foulke | 209—172 |
| 2,267,326 | 12/1941 | Eissmann | 209—133 |

OTHER REFERENCES

Harler; "Tea Manufacture," Oxford University Press, New York, pages 76–78.

FRANK W. LUTTER, *Primary Examiner.*